US012419731B2

(12) United States Patent
Leffert

(10) Patent No.: US 12,419,731 B2
(45) Date of Patent: Sep. 23, 2025

(54) THERAPEUTIC DEVICE FOR ALIGNING CANINE DIGITS

(71) Applicant: Sean C. Leffert, Arvada, CO (US)

(72) Inventor: Sean C. Leffert, Arvada, CO (US)

( * ) Notice: Subject to any disclaimer, the term of this patent is extended or adjusted under 35 U.S.C. 154(b) by 216 days.

(21) Appl. No.: 18/381,410

(22) Filed: Oct. 18, 2023

(65) Prior Publication Data

US 2024/0122692 A1 Apr. 18, 2024

Related U.S. Application Data

(60) Provisional application No. 63/417,252, filed on Oct. 18, 2022.

(51) Int. Cl.
*A61D 9/00* (2006.01)

(52) U.S. Cl.
CPC .................................... *A61D 9/00* (2013.01)

(58) Field of Classification Search
CPC ...... A01K 13/006; A01K 13/007; A61D 9/00; A61F 5/019; A61F 5/0585; A61F 5/05875; A61F 13/068; A43B 3/00; A43C 11/00; A63B 23/10
See application file for complete search history.

(56) References Cited

U.S. PATENT DOCUMENTS 4,877,018 A * 10/1989 Ikebe .................... A61F 13/068 36/94
5,076,263 A * 12/1991 Funatogawa ........ A61H 1/0266 132/73
7,677,206 B1 3/2010 Southworth
2005/0092260 A1 5/2005 Paxton et al.
2005/0188925 A1 9/2005 Yun et al.
2005/0241188 A1 11/2005 Yun et al.
2011/0179674 A1* 7/2011 Heid ........................ A43B 7/20 36/11.5
2017/0156289 A1* 6/2017 Chung ................. A01K 13/003
(Continued)

FOREIGN PATENT DOCUMENTS

WO WO-2014071462 A1 * 5/2014 ........... A01K 13/007

OTHER PUBLICATIONS

Walkin'Pets, The Proven Leader in Pet Mobility, Rear No. Knuckling Training Sock, https://www.handicappedpets.com/no-knuckling-training-sock/, downloaded Sep. 23, 2022, 1 pp.

*Primary Examiner* — Kari K Rodriquez
(74) *Attorney, Agent, or Firm* — James A. Sheridan; Sheridan Law, LLC

(57) ABSTRACT

There is disclosed a therapeutic device for aligning multiple digits to a midline of the canine foot. The device may include a flexible cuff with a dorsal and a palmar side and securable to the foot. Two outer elastic cords may each have a first end and a second end for attachment to the dorsal and the palmar sides, respectively. One end of a middle elastic cord may also attach to the dorsal side. The three cords may pass between a distinct adjacent pair within a 2$^{nd}$ through 5$^{th}$ digit. The outer cords may cross at a centralizing node under the foot's midline. A spacer mountable to each of the cords may be positionable between and shaped to align the digits. A second end of the middle cord may either couple the two outer cords at the node or loop around the node and attach to the dorsal side.

20 Claims, 11 Drawing Sheets

(56) References Cited

U.S. PATENT DOCUMENTS

| | | | | |
|---|---|---|---|---|
| 2019/0281793 | A1 | 9/2019 | Paxton et al. | |
| 2020/0009422 | A1* | 1/2020 | Zbinden | A63B 23/10 |
| 2020/0093095 | A1* | 3/2020 | Allami | A01K 13/007 |
| 2023/0020508 | A1* | 1/2023 | Mason | A01K 13/007 |

* cited by examiner

Doesal View

Dorsal View

Palmar View

Palmar Views

Dorsal View

THERAPEUTIC DEVICE FOR ALIGNING CANINE DIGITS

CROSS REFERENCE TO RELATED APPLICATIONS

This patent application claims priority to U.S. Provisional Application No. 63/417,252 filed on Oct. 18, 2022 and entitled THERAPEUTIC DEVICE FOR ALIGNING CANINE DIGITS, the entire contents of Application 63/417,252 being expressly incorporated by reference herein.

BACKGROUND

Domestic dogs may develop progressive varus and valgus abnormalities (deformity toward or away from the midline, including crossed toes) through the digits of their front and hind feet, and may also experience hyperextension and rotational abnormalities. Additionally, the toes may knuckle under the paw, causing pain and interfering with natural pad contact. These misalignments may become progressively worse with age. An increased risk of falling may result from the degraded pad-to-ground contact. Temporary splint bandages or booties may wrap the digits together with a sleeve or a sock to reduce flexion and pain, but may not space the toes or provide therapeutic correction, and may limit flexion and extension of the toes during running and walking. Dog booties may include a sole that isolates the paw pads from the ground and prevents natural splaying of the toes for adapting to a varied terrain.

Human toe separators (e.g. Yoga Toes® U.S. Pat. Nos. 9,949,858 and 8,932,186) may frictionally insert gel spacers molded to a slightly curved crossbar and into gaps between adjacent digits for aligning the toes. However, adapting this one-piece array to the dog's foot may not be compatible with the increased solar arc of a dog's foot, and the crossbar may interfere with normal ground contact at the paw pads. Additionally, wearing gel toes may require mindful coordination with the hosts shoe-wearing, barefoot, or sleeping activities which a dog would not be capable of managing. Additionally, dogs may chew or pull off gel toes.

The No-Knuckling Training Sock may consist of a boot with an elastic upper to lift up flexed toes, and which may include a Velcro® wrap around the ankle for picking up the toes. However, the product is only intended for temporary use and may not provide spacing nor align the toes with the midline. Similarly, the Toe-Up device by OrthoPets provides lift to a toe booty via a shock cord attached to an ankle wrap, but does not manage toe separation or encourage alignment to the midline of the foot. Furthermore, the Toe-up and no-knuckling devices may overbias the foot's range of motion toward extension.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an embodiment, there is disclosed a therapeutic device for aligning multiple canine digits of a foot of a dog to a midline of the foot. The device may comprise a flexible cuff adapted for securement to the dog's foot and having a dorsal side and a palmar side. The device may include two outer elastic cords each having a first end for attachment to the dorsal side of the cuff and a second end for attachment to the palmar side of the cuff. Additionally, the device may include one middle elastic cord having a first end also attachable to the dorsal side of the cuff and between the two outer cords. Each of the three cords may be configured to pass from the dorsal side, in parallel, and between a distinct adjacent pair of the multiple digits comprising a $2^{nd}$ through $5^{th}$ digit. The two outer cords may be configured to cross each other at a centralizing node under the foot and approximately at the midline.

A cylindrical spacer may mount along a tensioning length of each of the 3 cords and may be positionable between the distinct pair of digits. The spacer may be shaped and sized to separate and align the digits. A second end of the middle cord may be configured to either slidably couple the two outer cords at the centralizing node or loop around the centralizing node and attach to the dorsal side of the cuff after passing a second time between the $3^{rd}$ and the $4^{th}$ digits. The two outer cords may thereby be gathered together at the node for aligning the multiple digits toward the midline. while positioning the spacers between their respective digits.

In another embodiment, there is disclosed a therapeutic device for aligning multiple canine digits of a foot of a dog to a midline of the foot. The device may comprise a flexible cuff having a dorsal side and a palmar side and conformable to a metacarpal/metatarsal portion of the dog's foot. The device may include two outer elastic cords each having a first end for attachment to the dorsal side of the cuff and a second end for attachment to the palmar side of the cuff. Also included may be one middle elastic cord having a first end also attachable to the dorsal side of the cuff and between the two outer cords. Each of the three cords may be configured to pass from the dorsal side, in parallel, and between a distinct adjacent pair of the multiple digits comprising a $2^{nd}$ through a $5^{th}$ digit. The two outer cords may be configured to cross each other at a centralizing node under the foot and approximately at the midline.

The device may include a slotted spacer having opposing side surfaces shaped as an hourglass for conformally securing a gap between each of the adjacent pair of digits. The slotted spacer may have a forward end with a recessed cord slot centered between the hourglass sides. The spacer may include a rear end that is V-shaped for wedging between the adjacent digits. The spacer may be retainable along a length of each of the three cords by the respective cord slot. A second end of the middle cord may be configured to either slidably couple the two outer cords at the centralizing node or loop around the centralizing node and attach to the dorsal side of the cuff. The two outer cords may thereby be gathered together for aligning the multiple digits toward the midline.

In a further embodiment, there is disclosed a method for aligning multiple canine digits of a foot of a dog to a midline of the foot having one or more paw pads on its palmar side. The method may comprise securing a flexible cuff around a metacarpal/metatarsal portion of the foot, and selecting three spacers each conformable to gaps formed between a $2^{nd}$ through $5^{th}$ digit of the multiple canine digits for provisioning a therapeutic alignment thereof. The method may further comprise slidably mounting one of the spacers onto each of two outer elastic cords and one middle elastic cord via one of a bore or a slot in the spacer. The method may further comprise routing the two outer elastic cords through the $2^{nd}/3^{rd}$ and the $4^{th}/5^{th}$ gaps, crossing the outer cords at a centralizing node under the foot and approximately at the midline, attaching a first end of each outer cord to a dorsal side of the cuff, and tensionably attaching a second end of each cord to a palmar side of the cuff.

The method may also comprise routing the middle elastic cord through the $3^{rd}/4^{th}$ gap, attaching a first end of the middle cord to the dorsal side of the cuff, coupling the middle cord to the two outer cords at the centralizing node, and attaching a second end of the middle cord either to the centralizing node or to the dorsal side of the cuff after passing a second time between the 3rd and the 4th digits. Additionally, the method may comprise positioning the spacers between their respective adjacent digits for comfort and digital alignment, and navigating the three elastic cords around the paw pads to facilitate natural walking.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which.

DETAILED DESCRIPTION

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

As may be appreciated, based on the disclosure, there exists a need in the art for a therapeutic device that aligns the digits to the midline of a dog's foot and corrects rotational abnormalities. Further, there exists a need in the art for a device that is comfortably and removeably secured to the foot, and which resists attempts by the dog to chew off the device. Additionally, there exists a need in the art for an alignment device which is neutral in its bias toward flexion or extension of the digits.

Figure 1:
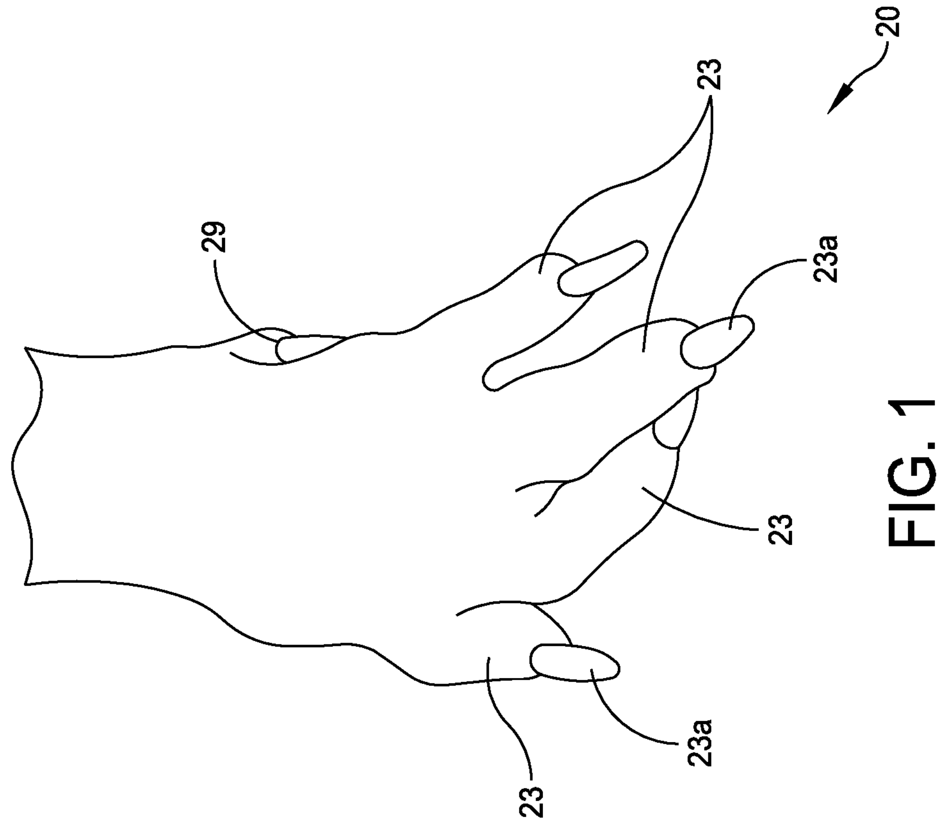
FIG. 1 illustrates toe deformities toward or away from the midline of a dog's foot, according to a background for the present disclosure.
Figure 2:
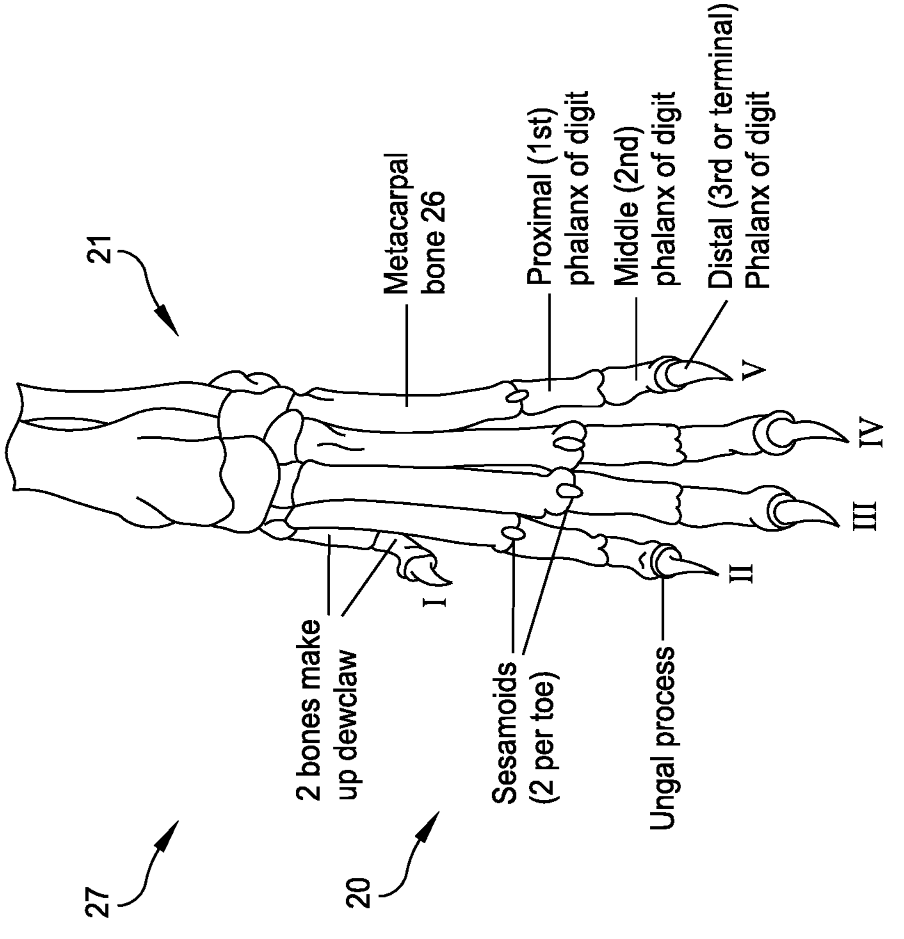
FIG. 2 illustrates a typical anatomy of a healthy dog's foot, according to a background for the present disclosure.

FIG. 1 illustrates toes 23, that are crossed, splayed out, or knuckled under, and which the disclosed device may correct. The 4 extended digits (toes) 23 of the dog's foot 20, shown in FIG. 2 as "II-V" from dorsal side 27, generally comprise a proximal, middle, and distal segment (claw 23*a*). The shorter 1st digit may have two segments and may be called a 'dew claw' 29. Each of the toes/digits 23 connect to a long bone called a metacarpal (front leg) 26 or metatarsal (rear leg, not shown), which then generally connect to a wrist or ankle 21 of the foot 20 (FIG. 2). Domestic dogs often develop progressive varus, valgus, hyperextension, and rotational abnormalities through the digits 23 of their front and hind feet 20. Increased incidence of this phenomenon seems to coincide with advanced aging, atrophic and osteoarthritic processes, and a subjective apparent decrease in quality of life likely attributable to pain and decreased general mobility Referring now to FIGS. 3*a*-5*c*, in various embodiments, a therapeutic device 10 is described for aligning multiple canine digits 23 of a dog's foot 20 to a foot midline 22. The device may comprise a flexible cuff 30 having a dorsal side 37 and a palmar side 38 and which may be adapted for removeable and conformable securement to a foot metacarpal/metatarsal portion 26. The device 10 may include a cuff clasp 32 for adjustably securing the cuff 30 to the foot 20 (FIGS. 3*b*-4*a*, 8-9). For example, the cuff clasp 32 may comprise mating portions of Velcro disposed on opposite cuff ends 34. The cuff 30 may be formed with a fabric comprising natural fibers, synthetic fibers, and/or elastic fibers (e.g. Spandex®) which may conform to the foot metacarpal/tarsal portion 26.

Figure 4B:
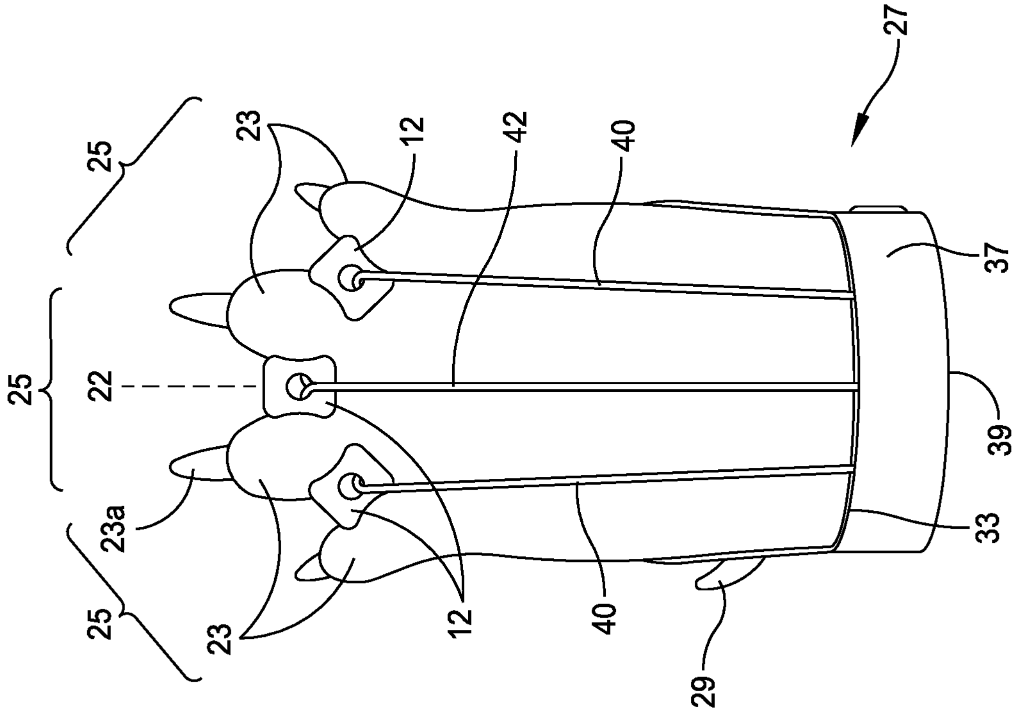
FIGS. 4*a*-4*b* illustrate palmar and dorsal views, respectively, of the therapeutic device on a paw, in accordance with an embodiment of the present disclosure.

The foot 20 may comprise the portion of the dog's leg distal from the ankle or wrist 21 of the leg and including the metacarpals (front) and metatarsals (rear) portions 26 extending through the toes 23. The foot midline 22 may lie approximately within a sagittal plane and may bisect the foot 20 along a front-back line (FIG. 4*b*). Ideal alignment of the digits 23 may mean that the digits 23 are approximately parallel to each other, spaced for healthy function, and aligned to the midline 22 of the foot 20.

Referring still to FIGS. 3*a*-5*c*, in various embodiments, the therapeutic device 10 may include three elastic cords for stringing through gaps 23*b* between the multiple digits 23 comprising a $2^{nd}$ through a $5^{th}$ digit 23, and which may comprise two outer cords 40 and one middle cord 42. The two outer elastic cords 40 may each have a first end 46 for attachment to the dorsal side 37 of the cuff 30 and a second end 48 for tensionable attachment to the palmar side 38 of the cuff 30. The middle elastic cord 42 may also have a first end 46 and a second end 48, the first end 46 being attachable to the cuff dorsal side 37 between the two outer cords 40; variations for attaching the second end 48 are described below. Each of the three elastic cords (40, 42) may be routed from the cuff dorsal side 37, in parallel, and between the four digits 23. After passing through the gaps 23*b* between the adjacent pairs 25 of digits 23 (FIG. 4*b*), the two outer cords 40 may cross at a centralizing node 44 under the foot 20 approximately at the midline 22, and then may tensionably attach to the palmar side 38 of the cuff at their second ends 48.

Figure 3A:
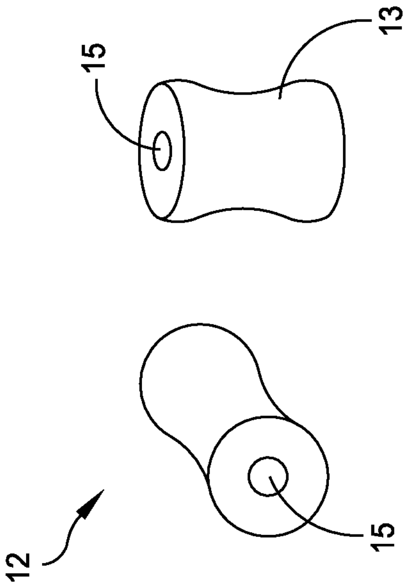
FIG. 3*a* illustrates perspective views of a cylindrical spacer of a therapeutic device for aligning canine digits, in accordance with an embodiment of the present disclosure.
Figure 3B:
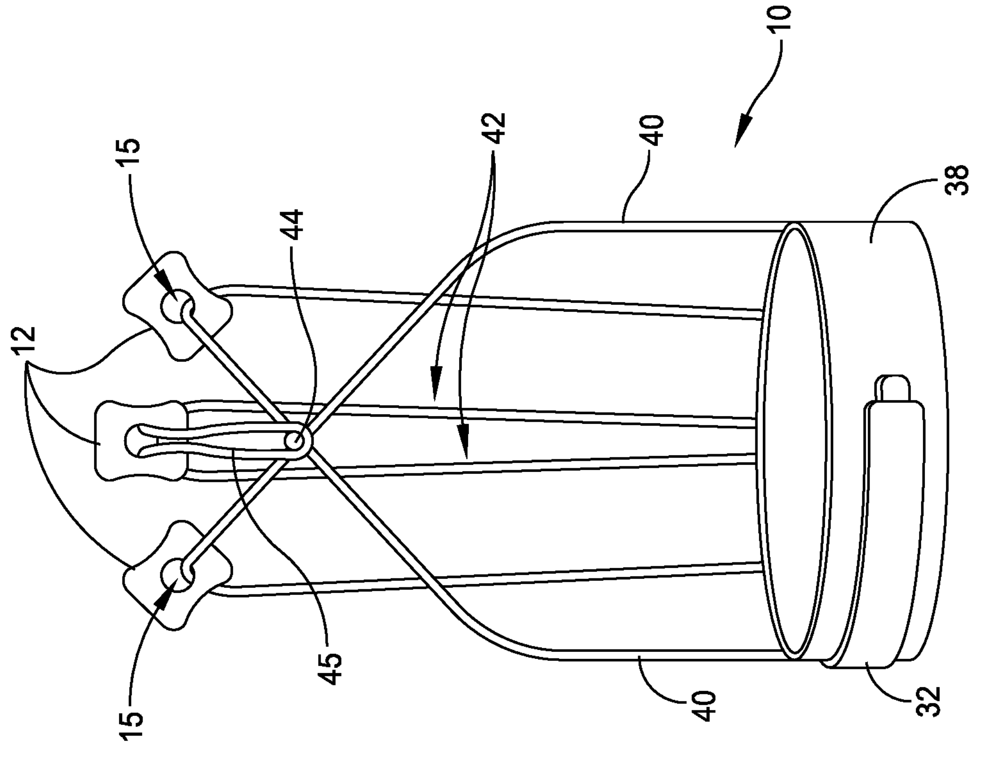
FIG. 3*b* illustrates a palmar view of the therapeutic device for aligning the canine digits, in accordance with an embodiment of the present disclosure.
Figure 4A:
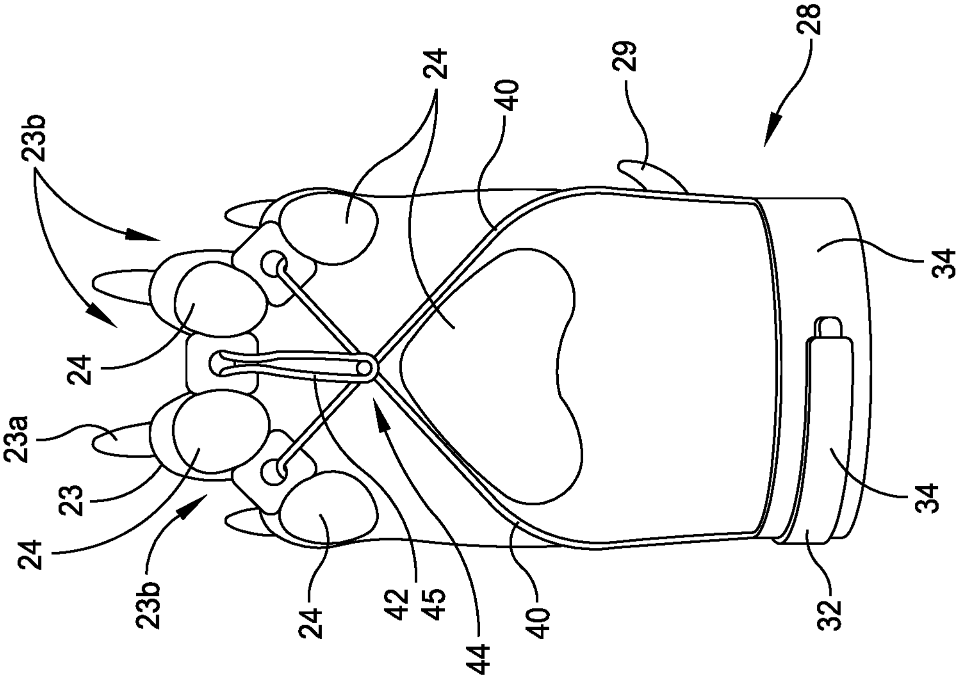
Figure 5C:
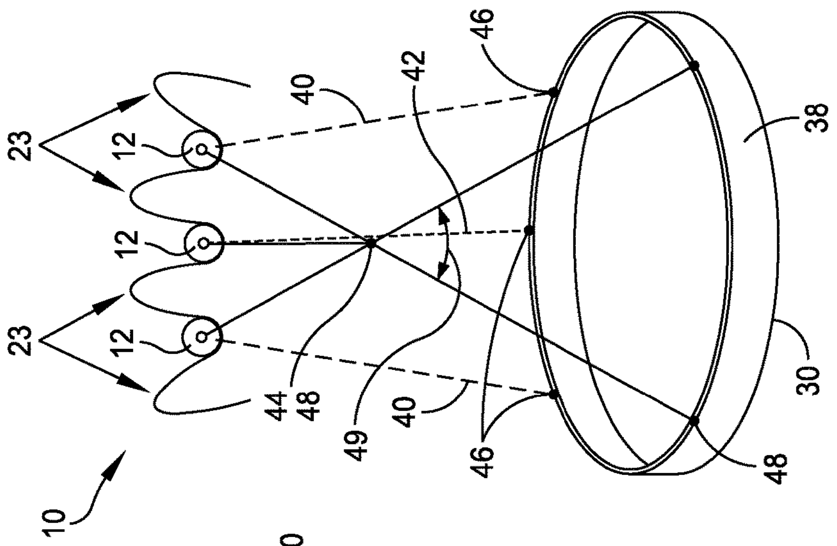
FIGS. 5*a*-5*c* illustrate mechanical views of crossing configurations for three elastic cords of the therapeutic device, in accordance with an embodiment of the present disclosure.
Figure 5B:
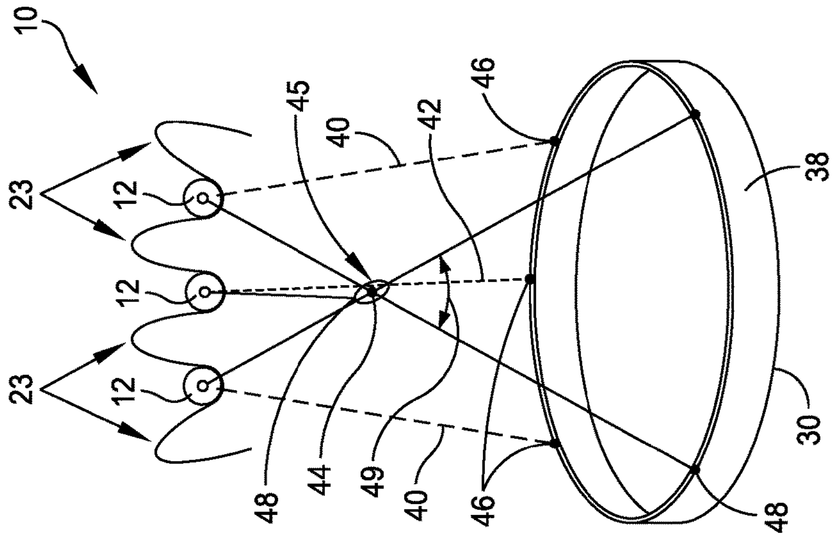
Figure 5A:
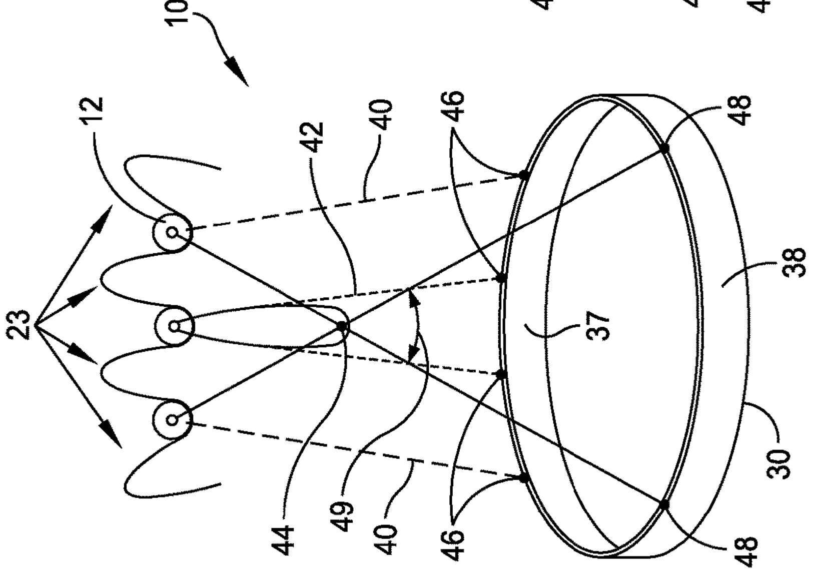
Figure 6C:
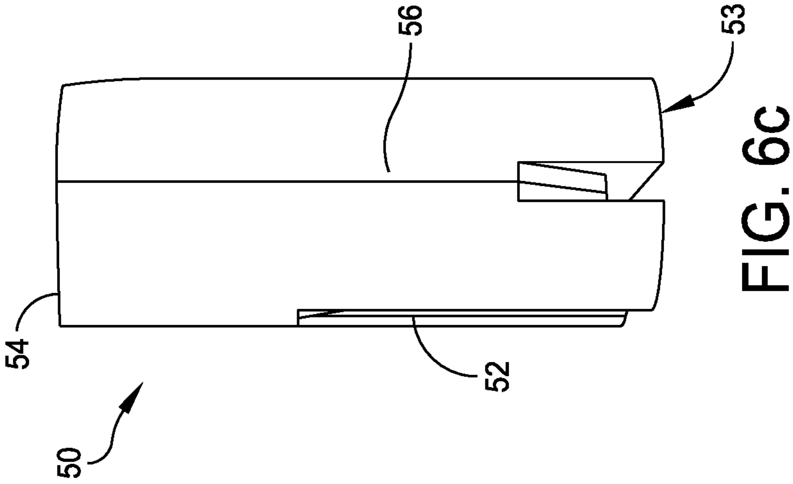
FIGS. 6*a*-6*c* illustrate CAD perspectives of a slotted spacer for the therapeutic device, in accordance with an embodiment of the present disclosure.
Figure 6B:
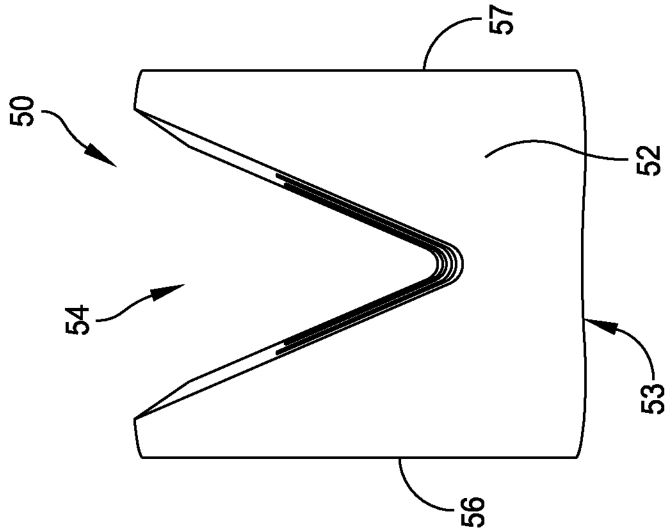
Figure 6A:
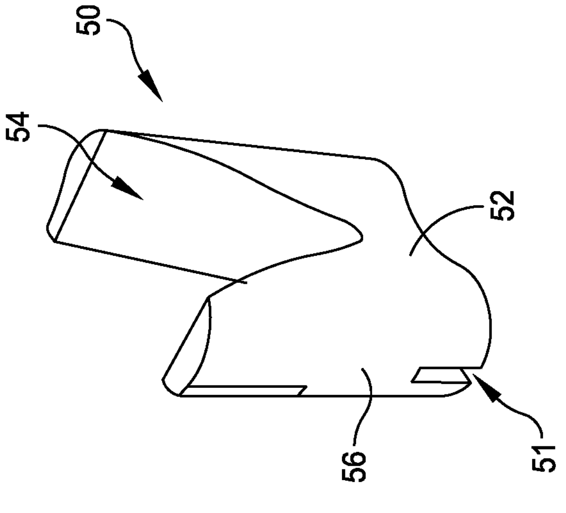
Figure 7B:
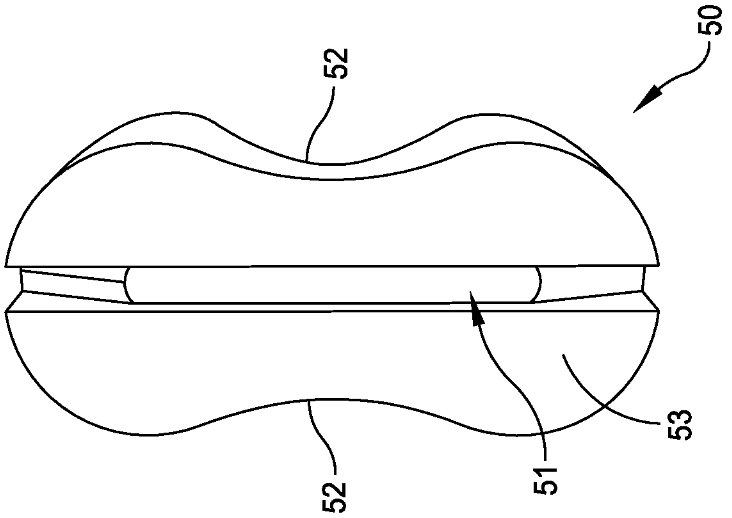
FIG. 7*a*-7*b* illustrate additional CAD perspectives of the slotted spacer of the therapeutic device, in accordance with an embodiment of the present disclosure.
Figure 7A:
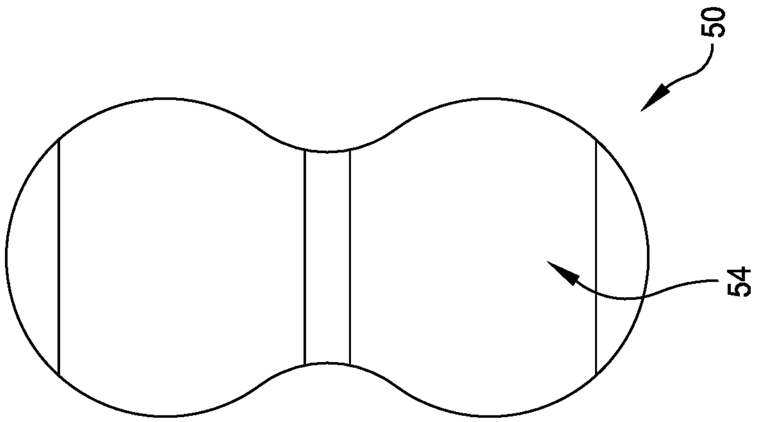
Figure 8:
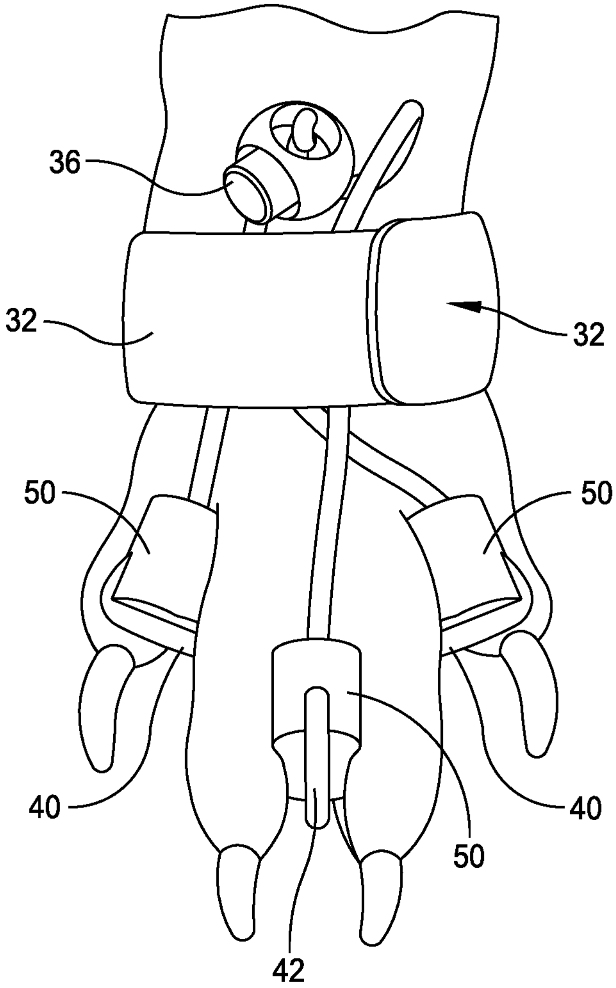
FIG. 8 illustrates a dorsal view of the therapeutic device mounted on a dog's foot, in accordance with an embodiment of the present disclosure.
Figure 9:
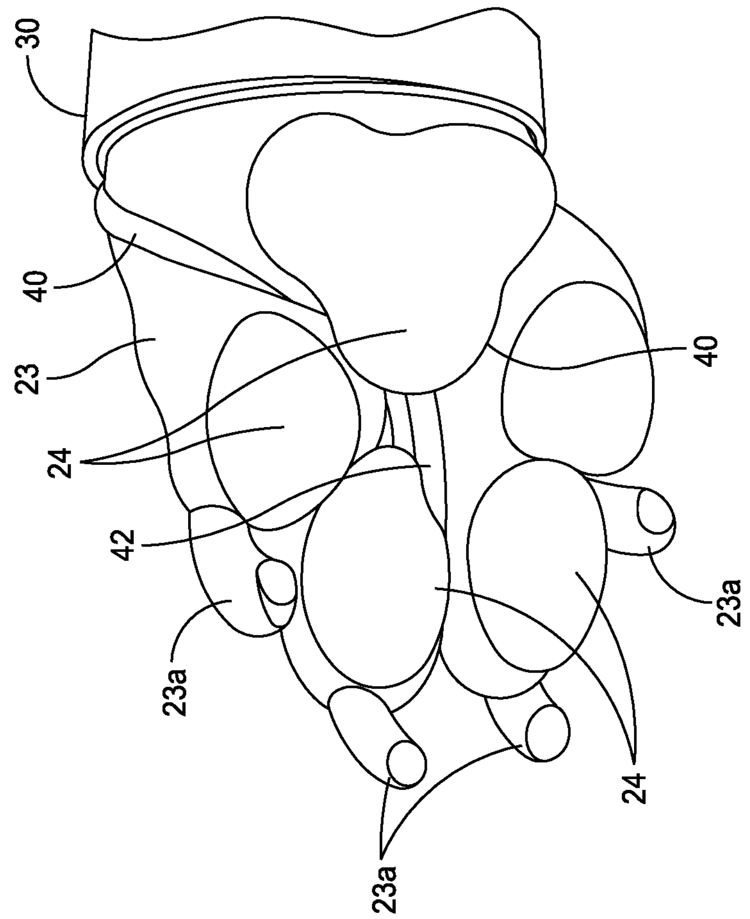
FIG. 9 illustrates a palmar view of the therapeutic device mounted on another dog's foot, in accordance with an embodiment of the present disclosure.

Now referring to FIGS. 4*a*-5*c*, in various embodiments, after routing through the $3^{rd}/4^{th}$ pair of adjacent digits 23, the second end 48 of the middle cord 42 may be configured to either attach to the two outer cords 40 at the centralizing node 44 (FIGS. 5*b*-5*c*) or be configured to loop around the centralizing node 44 and attach to the cuff dorsal side 37 (FIG. 3*b*, 4*a*, 5*a*). The looping may entail passing the middle cord 42 a second time between the $3^{rd}$ and the $4^{th}$ digits 23. Beneficially, the crossing of the two outer cords 40 on the foot palmar side 28, and the gathering and the looping by the middle cord 42, may compress the $2^{nd}$ through $5^{th}$ canine digits 23 toward the midline while navigating around the paw pads 24 for reliable ground contact. Additionally, the first ends 46 and the second ends 48 of the two outer cords 40 may attach to the cuff 30 on opposite cuff ends 34 for maintaining an acute angle 49 as shown in FIGS. 5*a*-5*c*.

Continuing with FIGS. 3*a*-5*c*, in various embodiments, a cylindrical spacer 12 may mount along a tensionable length of each of the three cords (40, 42) for positioning between each of the adjacent pairs of digits 25 (FIG. 4*b*). The spacer 12 may be shaped and sized to comfortably separate and stably align the digits 23, and may be configured to conform to the gaps 23*b* formed between the $2^{nd}$ through the $5^{th}$ digits 23. The spacers 12 may be slidably mounted onto each of two outer elastic cords 40 and the middle elastic cord 42 via one of a spacer bore 15 (FIG. 3*a*) or a slot (not shown) in the spacer. For example, the cylindrical spacer 12 may be compressible and include the bore 15 and concave sides 13 for conforming to the adjacent pair 25 of digits 23 being separated. The spacer bore 15 may occupy an axis of the cylindrical spacer 12 for slidably mounting each spacer 12 through one end of the elastic cord (FIG. 3*a*).

Alternatively, the spacer 12 may be disposed with a side channel (or the slotted spacer shown in FIG. 6*a*-7*b*, discussed below) which accommodates one or two passings of the elastic cord (40, 42). The side channel (not shown) may be configured for frictionally wedging the cord (40, 42). Alternatively, the bored spacer 12 may be split longitudinally from the concave surface 13 to the bore 15 for retainably popping the spacer 12 onto a mid-section of the elastic cord (40, 42).

The spacers 12 may be positioned in their respective gaps 23*b* for best comfort and therapeutic digital alignment. And once the spacers 12 and the elastic cords (40, 42) are installed, the palmar portion of the two outer cords 40 may be positioned to navigate around the paw pads 24 to facilitate natural walking. The spacer 12 may be fabricated from one of a medical gel, silicone, foam, plastic, and styrene ethylene butylene styrene (SEBS, for preventing interdigital abrasion and pressure sores). The concave sides 13, choice of fabrication materials, and elastic cord tension may act to retainably conform the spacers 12 to the digits 23 they are spacing. In the case where the middle cord 42 loops around the centralizing node 44 and passes again between the $3^{rd}$ and the $4^{th}$ digits 23, the slot or the bore 15 of the respective spacer 12 may be configured to receive a second passing of the middle cord 42.

Referring now to FIGS. 5*a*-5*c*, in various embodiments, the routing of the middle elastic cord 42 and its second end 48 termination is now described in further detail. The device 10 may include a centralizing loop 45 for slidably coupling the two outer cords to the second end of the middle cord at the centralizing node (FIG. 5*b*). The centralizing loop 45 may be made of fabric, rubber, plastic, or wire, and may be sown or otherwise attached to the second end 48 of the middle cord 42. The centralizing loop 45 may be configured to removably clasp around the centralizing node 44 after the two outer cords 40 are in place, or may be manufactured permanently looped around the two outer cords 40. Alternatively, the second end 48 may be removably attachable to the centralizing loop 45 via a snap, Velcro, tying, or other fastening methods known in the art. Beneficially, the middle cord 42 being slidably coupled around the centralization node 44 may provide for fine-tuning a position of the centralizing node 44 and the tension in the three elastic cords (40, 42) for an optimum therapeutic configuration.

Continuing with FIGS. 5*a*-5*c*, in another embodiment, the second end 48 of the middle cord 42 may directly and non-slidably connect to the two outer cords 40 at the centralizing node 44 by means of one or more of glue, a fibrous tie, melting, and a mechanical clasp (FIG. 5*c*). The fibrous tie (not shown) may comprise a fiber or filament of cloth, plastic, or metal tying the three cords (40, 42) together at the centralization node 44. The mechanical clasp (not shown) may be a clip, a hook, a snap, or a swaged fitting.

Continuing now with FIGS. 3*a*-5*c*, 8, and 9, the elastic cords (40, 42) may include rubber filaments within a polyester sheath, may be of monofilament design, or may be a shock cord similar to that used in recreational equipment. A diameter of the elastic cord may preferably be approximately 3 mm. Alternatively, the diameter may be substantially larger for large dogs requiring greater tension and smaller for small dogs who would otherwise experience excessive discomfort while wearing the device 10. Once all three cords (40, 42) are appropriately attached and tensioned, the spacers 12 may be finely positioned between their respective adjacent digits 25 for gently compressing the multiple digits 23 toward the midline 22 while retaining the spacers 12. One or more of the three elastic cords (40, 42) may include a cuff cinch 36 (FIG. 8) between the palmar 38 and the dorsal 37 sides of the cuff 30 for adjusting a length and a tension pulling the spacers 12 into the gaps 23*b*. The centralizing node 44 may also include a cinch (not shown) binding the two outer cords 40 on the cuff palmar side 38 for adjusting a position of the centralizing node 44.

Continuing with various embodiments, and referring to FIGS. 4*a*-4*b*, the cuff 30 may be configured to clasp around the metacarpals/metatarsals 26 adjacent to and proximal of the dew claw 29 for preventing cuff slippage toward the multiple digits 23. For example, a cuff distal edge 33 may be positioned above the dew claw 29 for maintaining a stable positioning of the spacers 12 (FIG. 4*a*-4*b*). In another embodiment (not shown), a cuff proximal edge 39 may be extended to capture a portion of an ankle/hock 21 of the foot 20 for preventing slippage toward the multiple digits 23. In other embodiments not shown, the fabric of the cuff may extend like a sock toward the digits 23 on the foot palmar side 28 for protecting portions of the feet 20 from rough ground. The extended cloth may include vacancies or holes allowing the paw pads 24 to contact the ground directly. Additionally, the extended cloth area may include cord channels for routing the outer elastic cords 40 on the foot palmar side 28 from the cylindrical spacer 12 to the palmar side 38 of the flexible cuff 30, which may thereby soften the impact of the cords (40, 42) and increase the dog's comfort level.

Referring now to FIGS. 6*a*-8, in an embodiment mentioned earlier, the device may include a slotted spacer 50 having opposing side surfaces 52 shaped as an hourglass for conformally securing the gap 23*b* between each of the adjacent pair of digits 25. The slotted spacer 50 may include a forward end 53 having a recessed cord slot 51 centered between the hourglass sides 52 and facing in the direction of walking. The slotted spacer 50 may also include a spacer rear end 54 that is V-shaped for wedging between the adjacent digits 25. The forward end 53 may be configured to receive the mid-section of the outer 40 or the middle 42 elastic cord without having to string the first end 46 or the second end 48 through a tunnel, as in the case of the bored spacer 12. The hourglass shape of the spacer sides 52 and a frictional fit of the cord (40, 42) into the recessed cord slot 51 may reliably retain the cord during a full day's activity of the dog. A depth 60 of the slot 51 may be sized to substantially embed the elastic cords (40, 42). An outer portion of the slot may bevel 62 inwardly toward the hourglass side 52 for pulling the spacer 50 toward an intersection of the adjacent digits 25.

Figure 10:
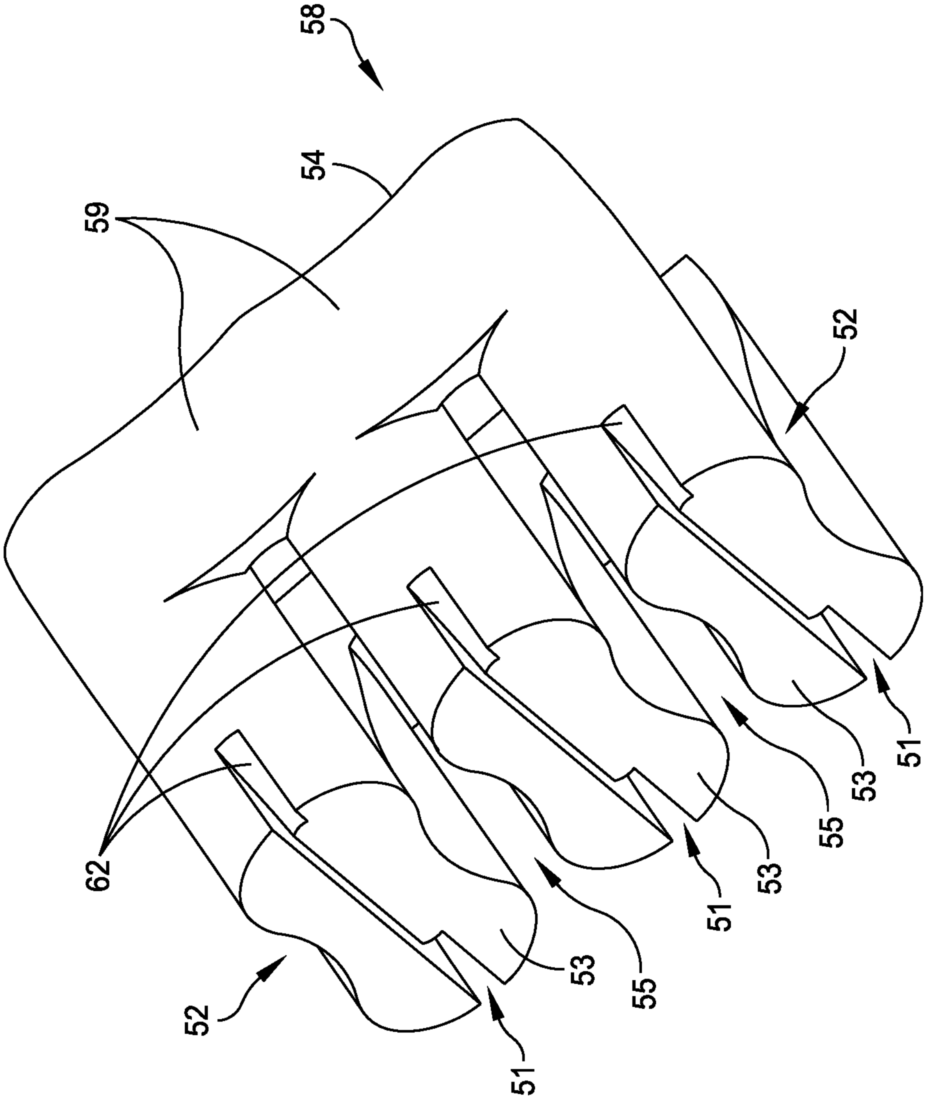
FIG. 10 illustrates a CAD perspective of a multi-spacer block for manufacturing three slotted spacers for the therapeutic device, in accordance with an embodiment of the present disclosure.
Figure 11:
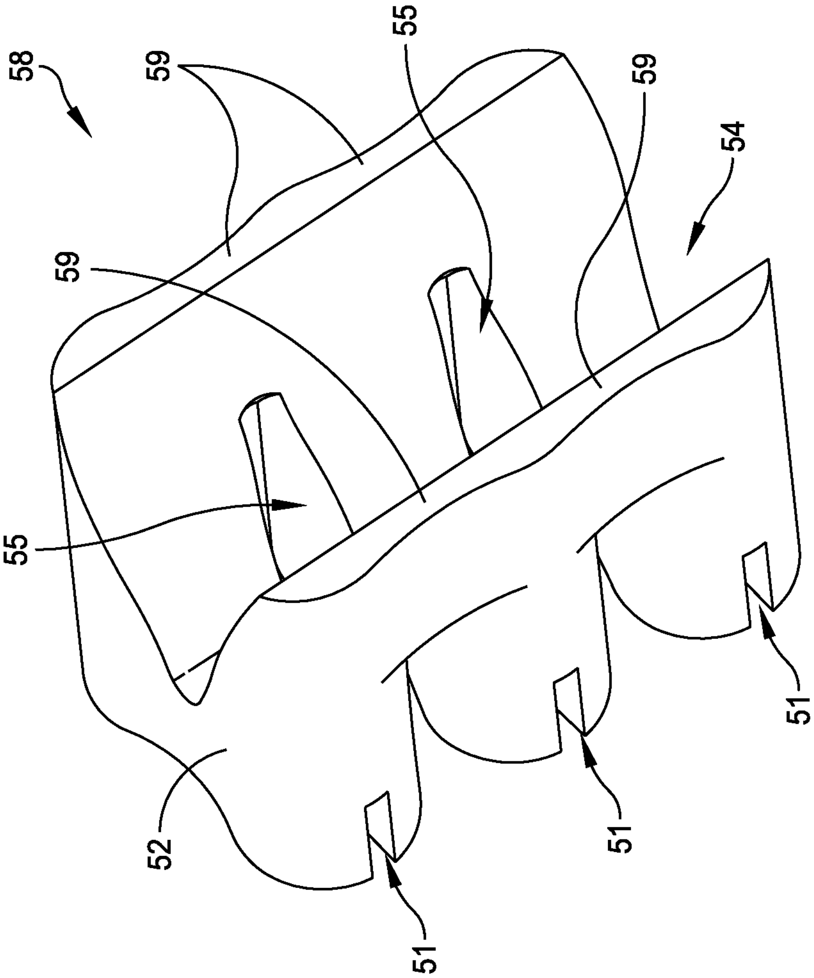
FIG. 11 illustrates another CAD perspective of the multi-spacer block for the therapeutic device, in accordance with an embodiment of the present disclosure.

Referring to FIGS. 10-11, in another embodiment, the device 10 may include a multi-spacer block 58 for manufacturing the slotted spacer 50 in a bank of three spacers 50, each pair of adjacent spacers in the bank separated by a claw channel 55 between the hourglass sides 52. The adjacent spacers may be bridged together with bridge 59 along the spacer rear ends 54, where the bridges 59 may be broken or cut for providing the three slotted spacers 50. Multi-spacer block 58 may alternatively be formed with a bridge 59 that follows an arc to match the solar arc (not shown) of the dog's foot 20; the forward 53 and the rear ends 54 may be shaped for installing the three elastic spacers 50 on the dog's foot 20 as one flexible unit in cases where the solar arc is shallow or of an even radius.

In various embodiments, referring again to FIGS. 3*a*-5, the device may be preconfigured with gel spacers of the cylindrical 12 or the slotted 50 variety and mounted on each of the 3 elastic cords (40, 42), sized for the dog at hand. Or, an installer of the device 10 may select, from a kit of different sized spacers, three spacers (12, 50), each conformable to gaps 23*b* formed between the $2^{nd}$ through the $5^{th}$ digits 23, and then may mount the selected spacers (12, 50) to each elastic cord (40, 42) before attachment to the flexible cuff 30.

The first ends 46 of the elastic cords (40, 42) may be pre-attached to the cuff dorsal side 37 by stitching by the manufacturer, and the second ends 48 may be attached by the installer once the cords (40, 42) have been fitted with spacers (12, 50) sized for the dog receiving the device 10. One or more of the cord ends (46, 48) may by removably attached to the cuff 30 by a button, snap, or other mechanical locking mechanism for installing the spacer. In another embodiment, both ends of the elastic cords (40, 42) may be stitched to the flexible cuff 30. Also, one or more attachment locations may terminate two or more cord ends, depending on manufacturing and installation efficiencies.

The aim of the canine digit spacers may be to separate toes in congruence with normal anatomy and to correct abnormal postural angulation during standing and ambulation. Improving toe orientation may improve the kinetic chain functioning and may decrease the prevalence of associated pain in these dogs. The device 10 may additionally reduce the risk of falls in geriatric dogs due to improved traction from proper digital pad-to-ground contact. "Palmar" is used throughout to refer to both the palm (underside) of the front feet and to the plantar side (sole) of the back feet.

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. A therapeutic device for aligning multiple canine digits of a foot of a dog to a midline of the foot, the device comprising:

a flexible cuff having a dorsal side and a palmar side and conformable to a metacarpal/metatarsal portion of the dog's foot;

two outer elastic cords each having a first end for attachment to the dorsal side of the cuff and a second end for attachment to the palmar side of the cuff;

one middle elastic cord having a first end also attachable to the dorsal side of the cuff and between the two outer cords, where each of the three cords are passable from the dorsal side and in parallel between a distinct adjacent pair of the multiple digits comprising a $2^{nd}$ through $5^{th}$ digit, the two outer cords being configurable to cross each other at a centralizing node under the foot and approximately at the midline;

a cylindrical spacer mountable along a tensioning length of each of the three cords and positionable between the distinct pair of digits, the spacer shaped and sized to separate and align the digits; and where a second end of the middle cord is configured to either slidably couple the two outer cords at the centralizing node or loop around the centralizing node and attach to the dorsal side of the cuff after passing a second time between the $3^{rd}$ and the $4^{th}$ digits, the two outer cords being thereby gathered together for aligning the multiple digits toward the midline while positioning the spacers between their respective digits.

2. The device of claim 1, further comprising:

a cuff clasp configured to secure the flexible cuff to the metacarpal/metatarsal portion of the foot.

3. The device of claim 2, wherein:

the cuff clasp comprises disposing mating portions of hook and loop fastener on opposite ends of the cuff.

4. The device of claim 1, wherein:

the cuff is configured to clasp around the metacarpals/metatarsals adjacent to and proximal of a dew claw of the foot for anchoring the tensioning length of the three cords.

5. The device of claim 1, further comprising:

a centralizing loop for slidably coupling the two outer cords to the second end of the middle cord at the centralizing node.

6. The device of claim 1, wherein:

the second end of the middle elastic cord is directly connected to the two outer cords at the centralizing node by means of one or more of glue, a fibrous tie, melting, and a mechanical clasp.

7. The device of claim 1, further comprising:

a bore through an axis of each cylindrical spacer for slidably mounting the spacer to one of the elastic cords.

8. The device of claim 1, wherein:

each cylindrical spacer is compressible and includes concave sides for conforming to and aligning the adjacent pair of digits being separated.

9. The device of claim 1, wherein:
each spacer is made of one or more of a medical gel, silicone, foam, plastic, and styrene ethylene butylene styrene.

10. The device of claim 1, wherein:
a proximal edge of the cuff is configured to capture a portion of an ankle/hock of the foot for preventing slippage toward the multiple digits.

11. A therapeutic device for aligning multiple canine digits of a foot of a dog to a midline of the foot, the device comprising:
a flexible cuff having a dorsal side and a palmar side and conformable to a metacarpal/metatarsal portion of the dog's foot;
two outer elastic cords each having a first end for attachment to the dorsal side of the cuff and a second end for attachment to the palmar side of the cuff;
one middle elastic cord having a first end also attachable to the dorsal side of the cuff and between the two outer cords, where each of the three cords are passable from the dorsal side and in parallel between a distinct adjacent pair of the multiple digits comprising a $2^{nd}$ through $5^{th}$ digit, the two outer cords being configurable to cross each other at a centralizing node under the foot and approximately at the midline;
a slotted spacer having opposing side surfaces shaped as an hourglass for conformally securing a gap between each of the adjacent pair of digits, a forward end with a recessed cord slot centered between the hourglass sides, and a spacer rear end V-shaped for wedging between the adjacent digits, the spacer retainable along a length of each of the three cords by the respective cord slot; and
where a second end of the middle cord is configured to either slidably couple the two outer cords at the centralizing node or loop around the centralizing node and attach to the dorsal side of the cuff after passing a second time between the $3^{rd}$ and the $4^{th}$ digits, the two outer cords being thereby gathered together for aligning the multiple digits toward the midline.

12. The device of claim 11, the device comprising:
a cuff clasp configured to secure the flexible cuff to the metacarpal/metatarsal portion of the foot.

13. The device of claim 11, wherein:
the cuff is configured to clasp around the metacarpals/metatarsals adjacent to and proximal of a dew claw of the foot for anchoring the tensioning length of the three cords.

14. The device of claim 11, further comprising:
a centralizing loop for slidably coupling the two outer cords at the centralizing node and to the second end of the middle cord.

15. The device of claim 11, wherein:
the slotted spacer is compressible and made of one or more of a medical gel, silicone, foam, plastic, and styrene ethylene butylene styrene.

16. The device of claim 11, further comprising:
a multi-spacer block for manufacturing the slotted spacer in a bank of three spacers, each adjacent spacers in the bank separated by a claw channel between the hourglass sides and bridged together along the spacer rear ends, where the bridges are broken or cut for providing the three slotted spacers.

17. A method for aligning multiple canine digits of a foot of a dog to a midline of the foot having one or more paw pads on its palmar side, the method comprising:
securing a flexible cuff around a metacarpal/metatarsal portion of the foot;
selecting three spacers each conformable to gaps formed between a $2^{nd}$ through $5^{th}$ digit of the multiple canine digits for provisioning a therapeutic alignment thereof;
slidably mounting one of the spacers onto each of two outer elastic cords and one middle elastic cord via one of a bore or a slot in the spacer;
routing the two outer elastic cords through the $2^{nd}/3^{rd}$ and $4^{th}/5^{th}$ gaps, crossing the outer cords at a centralizing node under the foot and approximately at the midline, attaching a first end of each outer cord to a dorsal side of the cuff, and tensionably attaching a second end of each cord to a palmar side of the cuff;
routing the middle elastic cord through the $3^{rd}/4^{th}$ gap, attaching a first end of the middle cord to the dorsal side of the cuff, coupling the middle cord to the two outer cords at the centralizing node, and attaching a second end of the middle cord either to the centralizing node or to the dorsal side of the cuff after passing a second time between the 3rd and the 4th digits; and
positioning the spacers between their respective adjacent digits for comfort and digital alignment, and navigating the three elastic cords around the paw pads to facilitate natural walking.

18. The method of claim 17, further comprising:
attaching the first ends and the second ends of the two outer cords to the cuff on opposite sides for continuing the crossing and establishing an acute angle pulling the digits toward the midline.

19. The method of claim 17, further comprising:
clasping the flexible cuff to the foot using mating portions of hook and loop fastener on opposite ends of the cuff.

20. The method of claim 17, further comprising:
positioning one or more of the following for preventing cuff slippage toward the multiple digits: a distal edge of the cuff above a dew claw of the foot, a proximal edge of the cuff over a portion of an ankle/hock of the foot.

* * * * *